United States Patent [19]

Gehring et al.

[11] Patent Number: 4,690,177
[45] Date of Patent: Sep. 1, 1987

[54] GRIPPER ROD FOR SHUTTLELESS LOOMS

[75] Inventors: Fritz Gehring, Lindau-Bodolz; Siegfried Roth, Salem-Mittelstenweiler; Hans-Juergen Semrau, Kippenhausen, all of Fed. Rep. of Germany

[73] Assignee: Lindauer Dornier Gesellschaft mbH, Lindau/Bodensee, Fed. Rep. of Germany

[21] Appl. No.: 871,510

[22] Filed: Jun. 6, 1986

[30] Foreign Application Priority Data

Jul. 30, 1985 [DE] Fed. Rep. of Germany ....... 3527202

[51] Int. Cl.$^4$ .............................................. D03D 47/00
[52] U.S. Cl. ..................................... 139/449; 74/422
[58] Field of Search ............... 139/449, 441, 444, 445, 139/446; 74/29, 30, 422

[56] References Cited

U.S. PATENT DOCUMENTS

| | | | |
|---|---|---|---|
| 2,151,085 | 3/1939 | Dewas | 139/449 |
| 3,402,746 | 9/1968 | Dewas | 139/449 |
| 3,854,418 | 12/1974 | Bretin | 74/422 |

FOREIGN PATENT DOCUMENTS

| | | | |
|---|---|---|---|
| 102588 | 3/1984 | European Pat. Off. | 139/449 |
| 1535491 | 4/1971 | Fed. Rep. of Germany | 139/449 |
| 2902729 | 2/1980 | Fed. Rep. of Germany | 139/449 |
| 1236544 | 6/1971 | United Kingdom | 139/449 |

*Primary Examiner*—Henry S. Jaudon
*Attorney, Agent, or Firm*—W. G. Fasse; D. H. Kane, Jr.

[57] ABSTRACT

A gripper rod for a shuttleless loom has a toothed rack section made of fiber reinforced synthetic composite, preferably thermoplastic, material. The toothed rack is made of a stack of belts of such material with rectangular perforations increasing in size from the inside out or from the bottom up. By compressing and simultaneously heating the stack the matrix material is cured, whereby the belts are bonded to one another. The gaps between the teeth may extend entirely through the rod or the rod may have a base also made of such belts but not having any perforations.

7 Claims, 9 Drawing Figures

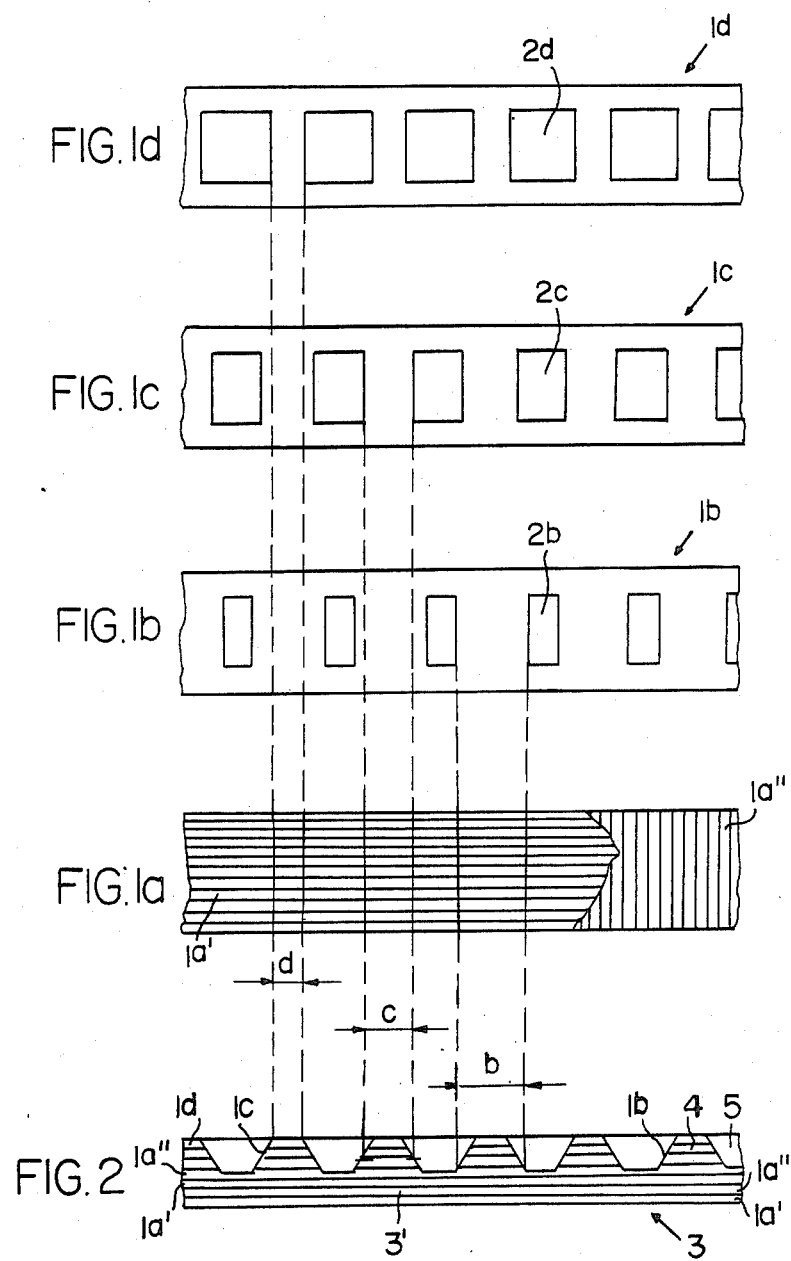

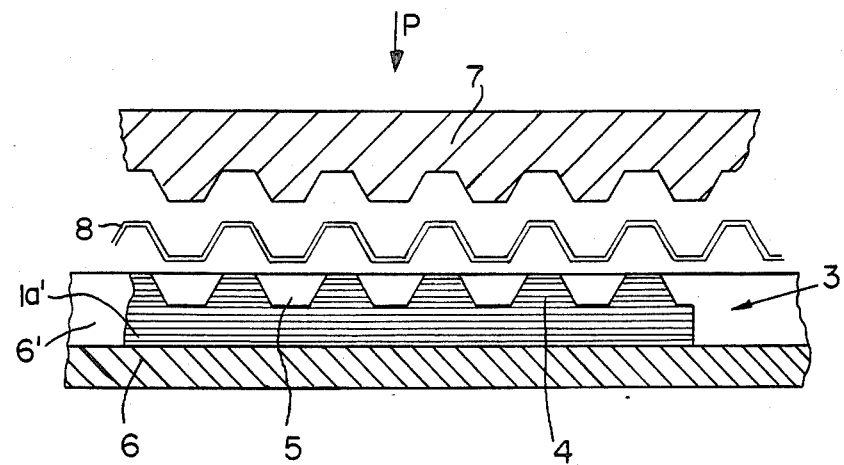

GRIPPER ROD FOR SHUTTLELESS LOOMS

FIELD OF THE INVENTION

The invention relates to a gripper rod for shuttleless looms. Such gripper rods include a toothed rack section for meshing with a pinion.

DESCRIPTION OF THE PRIOR ART

Such a gripper rod is, for example, disclosed in German Patent Publication (DE-PS) No. 1,535,491. The known gripper rod is manufactured by providing a hollow sectional member cut from tubular stock for example, with a lateral longitudinal slot and by mounting a toothed rack inside the tubular member in such a position that a drive pinion can mesh with the toothed rack through the longitudinal slot. The tubular member of the gripper rod may be made of metal or of any other suitable material while the toothed rack itself is normally made as a press-formed part of synthetic material. The hollow tubular member and the toothed rack inserted into the tubular member are bonded to each other by an adhesive bond. This type of construction, however, has still certain drawbacks because the adhesive bond frequently does not measure up to requirements. Thus, the adhesive layer may be absent altogether in certain spots or it may be insufficient in other spots. Additionally, there is a substantial difficulty in a proper matching of materials so that they are compatible for the adhesive bonding. Certain material combinations are not suitable for adhesive bonding.

The requirement for ever increasing operational speeds of such looms entails further difficulties because these increasing speeds apply acceleration and deceleration driving loads, to the teeth of a toothed rack pressed of synthetic material, which driving loads may exceed the load bearing capabilities of such materials so that the requirements are no longer satisfied. A replacement of the toothed rack of synthetic material by a toothed rack of a more suitable material, for example steel, is also not feasible due to the larger weight which is detrimental to the rapid acceleration and deceleration of the gripper rods. The required weight savings cannot readily be realized where steel is used for the toothed racks.

OBJECTS OF THE INVENTION

In view of the foregoing it is the aim of the invention to achieve the following objects singly or in combination:

to avoid the above problems by providing a gripper rod with a toothed rack section which is capable of taking up all the loads occurring at increased operational speeds of the gripper rods while nevertheless having a reduced weight as compared to steel toothed racks;

to construct a toothed rack of fiber composite material in such a way that the resulting gripper rod can be used without any additional machining operations; and to provide a method of construction of such gripper rods.

SUMMARY OF THE INVENTION

The above objectives have been achieved according to the invention in that the gripper rod, or at least the toothed rack section of the gripper rod, is made of a plurality of tapes or belts or layers of fiber composite materials which extend in their longitudinal direction. These layers have perforations or cut-outs of different sizes so that in the formed laminate structure the edges of the cut-outs form lines in the manner of topographical elevational lines. These layers in which the synthetic resin bonding material is not yet cured or not yet completely cured, are stacked to form a laminar structure which is then subjected to pressing and to a heat treatment, whereby the synthetic bonding material is cured and hardened, thereby bonding the layers or belts strongly to one another.

The fiber reinforced composite materials are preferably thermoplastic materials and, as a result of the compression, curing and bonding, the gripper rod itself has a high bending strength due to an intimate bonding between the toothed rack section and the outer configuration of the gripper rod. The fiber reinforced material preferably comprises a determined fiber orientation, whereby, for example, the fibers in one layer extend longitudinally of the gripper rod while the fibers in another layer extend perpendicularly to the length of the gripper rod. Such fiber orientation improves the mechanical strength and stiffness of the gripper rod and additionally, provides a substantial improvement in the strength of the individual teeth. Yet another advantage of the invention is seen in that after the curing and compression step the rod is ready for use without any further machining operations. If desired, the surface of the teeth may be covered by a wear resistant layer, such as Teflon (Registered Trademark) which is intimately bonded to the fiber composite material as a result of the curing.

BRIEF DESCRIPTION OF THE DRAWINGS

In order that the invention may be clearly understood, it will now be described, by way of example, with reference to the accompanying drawings, wherein:

FIG. 1a shows a plurality of layers with individually different fiber orientations for forming a base of the gripper rod;

FIG. 1b shows a layer with small cut-outs for the formation of teeth;

FIG. 1c shows a layer with intermediate size cut-outs for the formation of teeth;

FIG. 1d shows a top layer with large cut-outs for the teeth formation;

FIG. 2 is a longitudinal sectional view through a toothed rack section of a gripper rod according to the invention;

FIG. 5 illustrates a sectional view through a compression tool used for making gripper rods according to the invention.

DETAILED DESCRIPTION OF PREFERRED EXAMPLE EMBODIMENTS AND OF THE BEST MODE OF THE INVENTION

FIG. 1a shows a plurality of layers 1a' and 1a", wherein the fibers in the layer 1a' are oriented in parallel to each other and to the longitudinal axis of the gripper rod 3, and wherein the fibers in the layer 1a" are also oriented in parallel to one another, however perpendicularly to the longitudinal axis of the rod 3. Thus, layers with one unidirectional fiber orientation may alternate with layers of another unidirectional fiber orientation as shown in FIG. 2.

Instead of the just described individual layers with a uniform fiber orientation, it is possible to use synthetic material tapes or belts known as so-called prepregs. Such prepregs already comprise several individual layers formed into a stack in which the fibers cross each other from layer to layer.

Figure 3B:
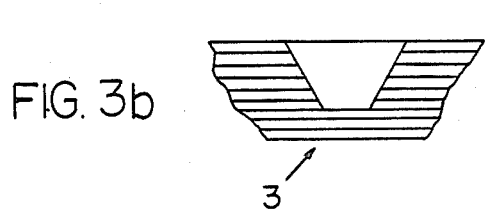
FIG. 3b is a sectional view similar to that of FIG. 3a after the compression step.

As shown in FIG. 2 a plurality of layers without apertures or cut-outs are first assembled to form a base 3' on which layers 1b, 1c, and 1d are placed in succession so that the layer 1b with the smallest apertures or cut-outs 2b is the first layer on the base 3' followed by the layer 1c with the intermediate size cut-outs 2c shown in FIG. 1c, which is then followed by the layer 1d with the largest cut-outs 2d as shown in FIG. 1d. Although only three layers with cut-outs or apertures are shown, a larger number may be used if desired, see FIG. 3a. The lands b, c, and d between the cut-outs form the teeth 4, while the cut-outs 2b, 2c and 2d form the gaps 5 between the teeth 4. By viewing FIGS. 1a to 1d, and and 2 in conjunction, it will be noted that the widths of the lands b, c, and d become narrower in a direction from the inside out, while the widths of the apertures or cut-outs 2b, 2c, 2d become larger in said outward direction. As a result, the edges 10 shown in FIG. 3 form a stepped pattern in the manner of topographic elevational lines. However, this stepped pattern is smoothed out as shown in FIG. 3b by the compression and curing step to be described below with reference to FIG. 5.

Figure 4:
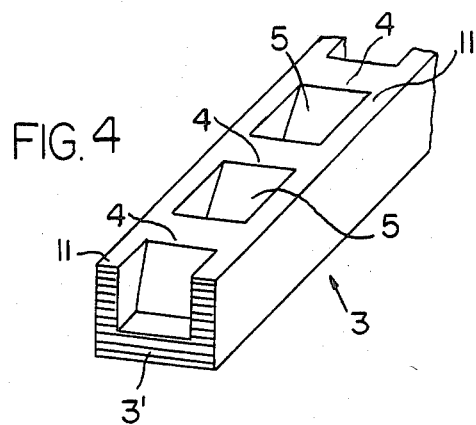
FIG. 4 is a perspective view through the toothed rack section of a gripper rod according to the invention.

As shown in FIG. 4, the teeth 4 and the gaps 5 between the teeth are bounded by lateral walls 11 contributing to the bending strength of the gripper rod. The gripper rod shown in FIG. 4 is the result of the operation shown in FIG. 5 and does not require any additional machining operation. In other words, the gripper rod according to the invention is ready for use when the curing is completed without any further surface treatment or machining operation.

Figure 3A:
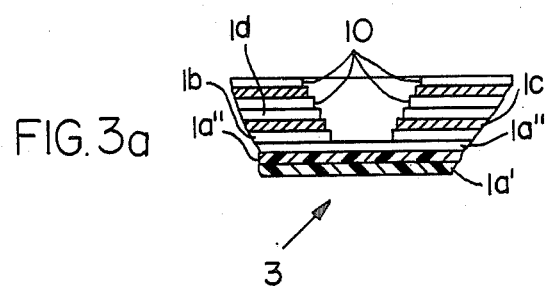
FIG. 3a shows, on an enlarged scale, a sectional view similar to that of FIG. 2, however prior to the compression step.

Incidentally, using different hatching orientations and no hatching for certain layers in FIG. 3a, shall indicate that the various layers may be made of different materials, for example, synthetic resin layers reinforced with carbon fibers may alternate with synthetic layers reinforced with aramide fibers or with glass fibers or other suitable fibers.

FIG. 5 illustrates the laminating of the layers 1a' and so forth in the lower mold section 6 of a compression tool also having an upper mold section 7 for molding the laminated layers into the required shape. When the layering is completed, and the upper mold is pressed downwardly in the direction of the arrow P, the lateral walls 6' of the lower mold section 6 will hold the laminate structure in place so that the teeth 4 and the gaps 5 will be formed. The upper mold section 7 is provided with downwardly extending teeth and gaps having a configuration corresponding to the desired configuration for the toothed rack section 3.

The operating conditions for the just described laminating and molding operations will depend on the type of materials used for making the present gripper rods, especially the matrix resin materials in which the reinforcing fibers are embedded. For example, thermoplastic resin matrix materials having a melting or softening point below about 250° C. can be softened sufficiently within about 10 to 15 minutes, more or less, at pressures within the range of about 10 to 15 bars, more or less, by applying a temperature supplied by the manufacturer of the respective resin material. The final forming pressure is then increased to about 100 bars, more or less, for about 10 to 15 minutes, more or less, whereby the temperature is maintained just slightly above the melting point. Cooling then takes place preferably while maintaining the molding pressure of about 100 bars. Resin matrix materials having a higher melting point may be softened and molded at lower pressures, for example the softening or melting may take place at about 10 bars, more or less, and the molding and cooling may take place at about 50 bars, more or less. All pressures are gage pressures.

If it is desired to improve the wear and tear characteristic of the teeth surfaces, a wear resistant layer 8 may be laminated to the surface of the teeth during the compression, whereby the bonding between the teeth and the wear improving layer 8 is accomplished by the curing of the resin matrix material. As mentioned, Teflon (Registered Trademark) forms a good wear resistant layer. Preferably, the layer 8 is preformed prior to its insertion into the mold. It is also sufficient if the layer 8 covers only the teeth surfaces and not the surfaces of the side walls.

Although the invention has been described with reference to specific example embodiments, it will be appreciated, that it is intended to cover all modifications and equivalents within the scope of the appended claims.

What is claimed is:

1. A gripper rod for a shuttleless loom, comprising a toothed rack section for cooperation with a pinion for driving said gripper rod, said gripper rod comprising a plurality of fiber reinforced belts of synthetic material laminated and bonded to one another to form a stack of said fiber reinforced belts, said belts further comprising perforations with dimensions increasing from belt to belt in an outward direction, and lands with correspondingly decreasing dimensions from belt to belt in said outward direction, said belts being arranged relative to each other so that said perforations are arranged in alignment relative to a central perforation axis extending perpendicularly to planes defined by said perforations in said belts so that teeth are formed by said lands between adjacent perforations for meshing with said pinion.

2. The gripper rod of claim 1, wherein said belts are prepregs of fiber reinforced composite synthetic materials arranged as a laminate structure with a unidirectional fiber orientation in each belt, and wherein said perforations are rectangular cut-outs, whereby said fibers extend substantially in parallel to edges of said rectangular cut-outs.

3. The gripper rod of claim 1, wherein said gripper rod comprises a further plurality of belts without perforations laminated and bonded to one another and to said stack of belts to form a base for said first mentioned plurality of belts.

4. The gripper rod of claim 3, wherein said fiber reinforced belts comprise belts made of different types of fiber reinforced synthetic composite materials, and wherein belts of one material type alternate with belts of another material type.

5. The gripper rod of claim 1, wherein said gripper rod further comprises a layer of wear resistant material bonded to an outermost belt of said belts.

6. The gripper rod of claim 5, wherein said wear resistant layer covers said belts prior to any pressure and heat treatment for bonding said layer to said belts.

7. The gripper rod of claim 5, wherein said wear resistant layer has a preformed toothed configuration conforming to that of said toothed rack.

* * * * *